United States Patent [19]

Takeda et al.

[11] Patent Number: 5,805,541
[45] Date of Patent: Sep. 8, 1998

[54] CIRCUMFERENTIAL DATA RECORDING/REPRODUCING WITH A MICROVIBRATION SCANNING PROBE

[75] Inventors: Akihiro Takeda, Atsugi; Ryo Kuroda, Kawasaki; Toshimitsu Kawase, Ebina, all of Japan

[73] Assignee: Cannon Kabushiki Kaisha, Tokyo, Japan

[21] Appl. No.: 599,240

[22] Filed: Feb. 9, 1996

[30] Foreign Application Priority Data

Feb. 13, 1995 [JP] Japan .................................... 7-047741
Feb. 7, 1996 [JP] Japan .................................... 8-045467

[51] Int. Cl.⁶ ............................. G11B 9/00; G02B 21/00
[52] U.S. Cl. .......................... 369/126; 250/306; 369/101
[58] Field of Search .................................... 369/126, 101, 369/44.34, 119; 250/306, 307

[56] References Cited

U.S. PATENT DOCUMENTS

| | | | |
|---|---|---|---|
| 5,222,060 | 6/1993 | Kuroda et al. | 369/126 |
| 5,289,455 | 2/1994 | Kuroda et al. | 369/126 |
| 5,375,114 | 12/1994 | Hatanaka et al. | 369/126 |
| 5,404,349 | 4/1995 | Nose et al. | 369/126 |
| 5,412,641 | 5/1995 | Shinjo et al. | 369/126 |
| 5,418,363 | 5/1995 | Elings et al. | 369/126 |
| 5,446,720 | 8/1995 | Oguchi et al. | 369/126 |
| 5,481,522 | 1/1996 | Oguchi et al. | 369/126 |
| 5,506,829 | 4/1996 | Yagi et al. | 369/126 |

FOREIGN PATENT DOCUMENTS

| | | | |
|---|---|---|---|
| 0247219 | 12/1987 | European Pat. Off. | |
| 0272935 | 6/1988 | European Pat. Off. | G11B 9/08 |
| 63-161552 | 7/1988 | Japan | G11B 9/00 |
| 63-161553 | 7/1988 | Japan | G11B 9/00 |
| 4-212737 | 8/1992 | Japan | G11B 9/00 |

OTHER PUBLICATIONS

Physical Review Letters, G. Binning et al., vol. 49, No. 1, pp. 57–61, Jul. 5, 1982, "Surface Studies by Scanning Tunneling Microscopy".

*Primary Examiner*—David C. Nelms
*Assistant Examiner*—Kim-Kwok Chu
*Attorney, Agent, or Firm*—Fitzpatrick, Cella, Harper & Scinto

[57] ABSTRACT

In an information processing apparatus for recording and/or reproducing a circumferential data string from a recording medium, there are provided a scanning mechanism for performing relative movement of the probe and the recording medium so that the probe scans the recording medium, a driving circuit for supplying a drive signal to the scanning mechanism so as to permit the probe to scan the recording medium circumferentially, an oscillation circuit for performing micro-vibration of the probe in a direction perpendicular to the data string, a detection circuit for detecting a signal that corresponds to a positional deviation of the probe from the data string, and a multiplier for multiplying the signal that is detected and the drive signal.

3 Claims, 13 Drawing Sheets

ALWAYS CHANGE TRACKING DIRECTION

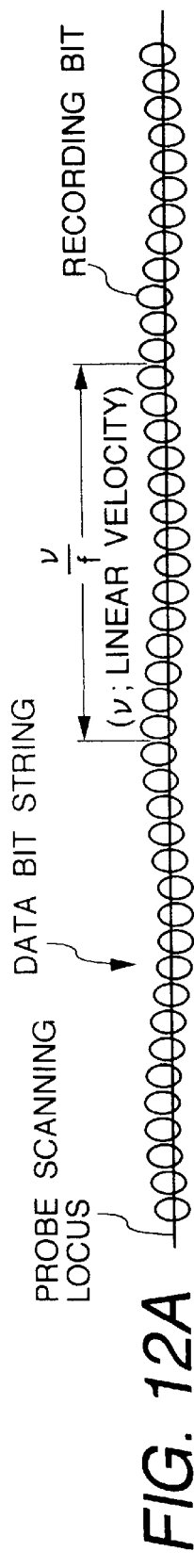
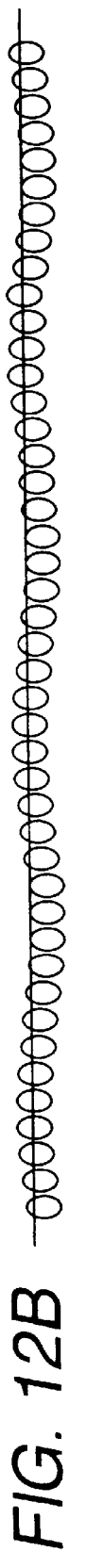
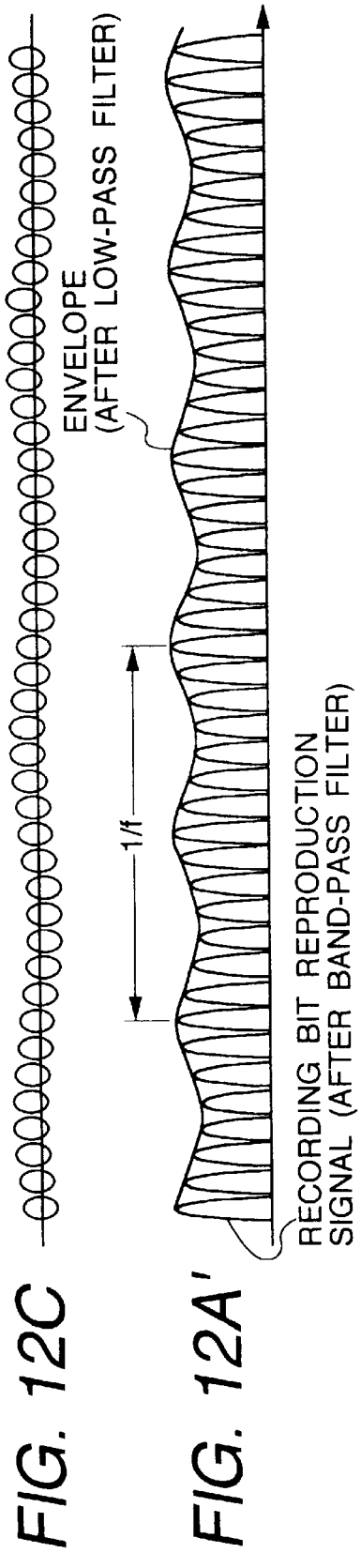
FIG. 12A
FIG. 12B
FIG. 12C
FIG. 12A'
FIG. 12B'
FIG. 12C'

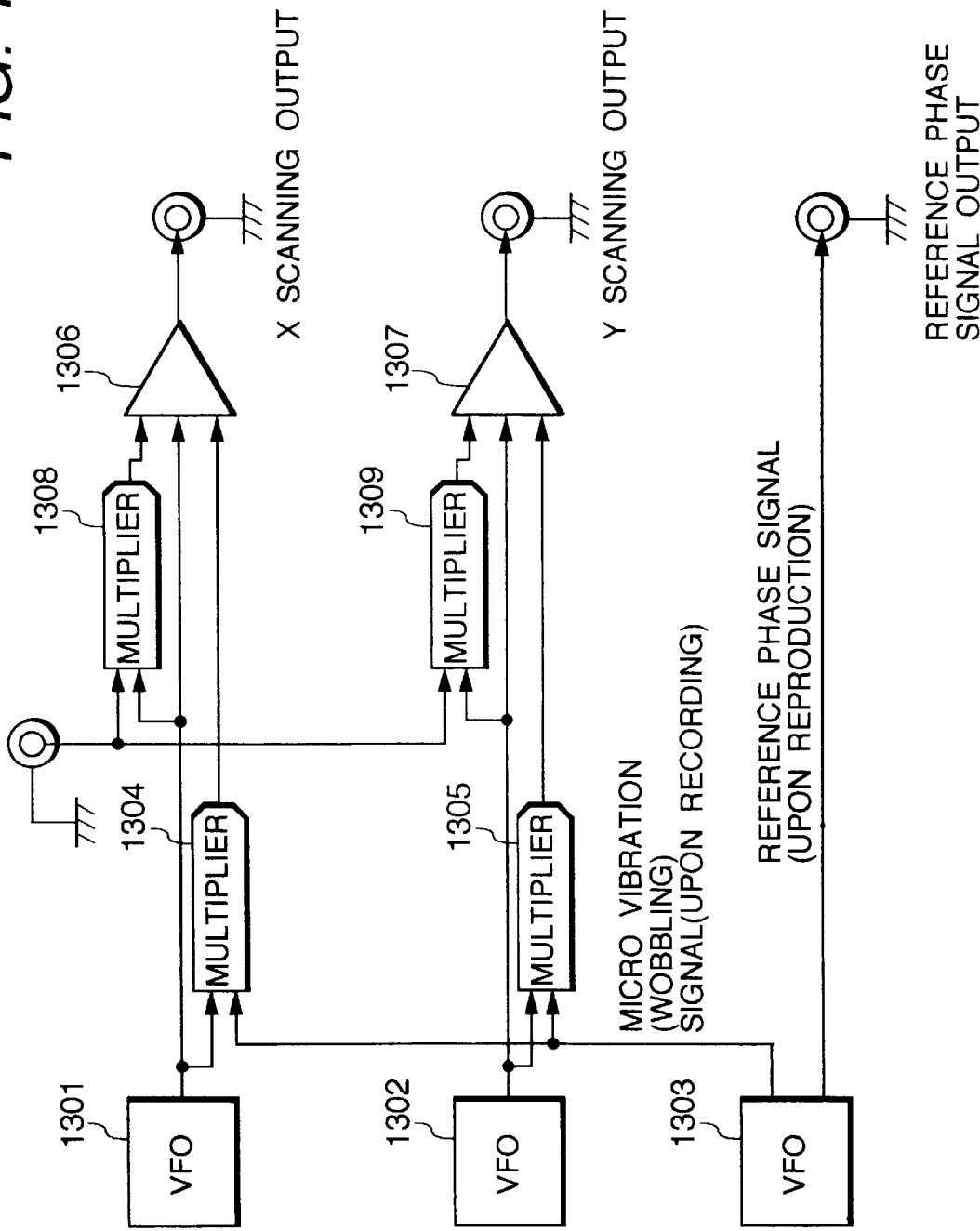

CIRCUMFERENTIAL DATA RECORDING/REPRODUCING WITH A MICROVIBRATION SCANNING PROBE

BACKGROUND OF THE INVENTION

1. Field of the Invention

The present invention relates to an information processing apparatus that has a position drift detector that is preferably employed for a recording and reproduction apparatus to which the principle of, for example, a scanning probe microscope is applied.

2. Related Background Art

Currently, memory product applications constitute the core of the electronics industry, built around the production and use of computers and associated devices, video disks, digital audio devices, etc., and the development of such products has been aggressively pursued. Although the performance that is demanded of memory products varies, depending on the application, what are commonly required are large, high density recording capacities, high response speeds for recording and reproduction, low power consumption, high productivity, low manufacturing costs, etc.

Conventionally, magnetic memory devices utilizing magnetic members or semiconductor memory devices utilizing semiconductors have been primarily employed. But now, in consonance with current advances in laser techniques, an inexpensive medium by which high density recording is possible has appeared: an optical memory product that employs an organic thin film, such as an organic pigment or photopolymer. More or less concurrently, a scanning probe microscope (hereinafter referred to as an "SPM") has been developed with which the electron structure of atoms on the surface of a conductor can be directly observed, thus enabling the high resolution measuring of real space images, regardless of whether for a single crystal or for a non-crystalline material. Other additional advantages of the SPM are that observations can be conducted at low power, which eliminates the risk that recording media will be damaged by current, and that it can be operated in the atmosphere and can be employed with various types of products. For these reasons, the production of SPMs that are suitable for a wide range of applications is expected.

SPM is a general term used to describe an STM (Scanning Tunneling current Microscope) and an AFM (Atomic Force Microscope), or an SCAM (Scanning Capacity Microscope). For example, the STM utilizes the phenomenon whereby a tunneling current is induced when a metal probe (a probe electrode) is positioned adjacent to a conductive material at a distance of approximately 1 nm (G. Binning et al. Phys. Rev. Lett, 49, 57 (1987)).

This tunneling current is very sensitive to changes in distance between the probe and the conductive material. The scanning with the probe is so performed that a constant tunneling current is maintained, so that the surface structure in real space can be drawn, while at the same time various data concerning the surface electrons that make up the electron cloud can be read. At this time, the resolution in an in-plane direction is about 0.1 nm. Therefore, by using the SPM principle, recording and reproduction at high density on the atomic order (subnanometer) can be fully performed. As such recording and reproduction methods, proposed are a method for changing the surface condition of a desired recording layer by using high energy, such as a particle beam (an electron beam or an ion beam) or an X-ray beam, to record data, and for reproducing the data by employing an SPM; and a method for recording and reproducing data using an SPM by employing, as a recording layer, a material in which the memory effect that is produced is relative to a voltage and a current switching characteristic, such as a thin film layer composed of a π electron organic compound or a chalcogen compound (Japanese Patent Laid-open Application Nos. 63-161552 and 63-161553).

According to these methods, with a recording bit having a size of 10 nm, a large capacity of $10^{12}$ bits/$cm_2$ is acquired for recording and reproduction.

In such an SPM memory, as a single data bit is very small and the width of a data bit string is therefore very narrow, when data are reproduced, temperature factors and external vibration can affect a probe and cause it to drift, so that it is shifted away from a data bit string in a direction perpendicular to the data string. Since this may result in the irregular reproduction of data, the tracking method, and an apparatus therefor, that is disclosed in Japanese Patent Laid-open Application No. 4-212737 was developed to provide stable reproduction of even a minute data bit string in an SPM memory. According to this reference, a probe is delicately vibrated relative to a data string in a direction perpendicular to the length of the data string, and a phase change that occurs in an envelope of a data string reproduction signal is detected, so that a deviation value in a direction perpendicular to the length of the data string is acquired. In consonance with this result, feedback control is performed to relocate the probe to correct its positioning.

The circumferential scanning method shown in FIG. 1 is proposed as a method for the scanning of a recording medium by a probe in an SPM memory (European Patent Publication No. EP-A-0247219). According to this method, as is shown in FIG. 1, signal waveforms, $\sin 2\pi f't$ and $\cos 2\pi f't$ (wherein f': circumferential scanning frequency, and t: time), are applied to electrodes for the respective x and y scanning of cylinder type piezoelectric elements to cause the free ends of the piezoelectric elements to perform a so-called precession movement so that the probe circularly scans a recording medium for recording and for reproduction.

However, in the above described conventional circumferential scanning method, if a conventional tracking system as described in Japanese Patent Laid-open Application No. 4-212737 is to be adopted as a method that enables a probe to trace along a data bit string during recording and reproduction, not only an actuator for circumferential scanning (a cylinder type piezoelectric element in the above prior art example), but also an actuator for micro-vibration and for tracking is required, which contributes to the complexity of the device structure. In addition, with the circumferential scanning method, as the direction in which an actuator is driven is changed as it travels along the circumference, so that the direction in which the probe tracks a data bit string is shifted, the unchanged conventional tracking system cannot be employed for the circumferential scanning method.

SUMMARY OF THE INVENTION

To resolve the above-described conventional shortcomings, it is one object of the present invention to provide an information processing apparatus that records and reproduces data by circumferential scanning, and that can stably reproduce and process a large volume of data at high speed.

To achieve the above object, in an information processing apparatus of the present invention, in which recording and/or reproduction of a circumferential data string from a recording medium is effected using a probe, there are provided:

a scanning mechanism for performing relative movement of the probe and the recording medium so that the probe scans the recording medium;

a drive circuit for supplying a drive signal to the scanning mechanism 60 as to permit the probe to scan the recording medium circumferentially;

a vibration circuit for performing micro-vibration of the probe in a direction perpendicular to the data string;

a detection circuit for detecting a signal corresponding to a positional deviation of the probe with respect to the data string; and a multiplying circuit for multiplying the detection signal detected by the drive signal.

A detailed explanation will be given in the following description of the preferred embodiments.

BRIEF DESCRIPTION OF THE DRAWINGS

FIGS. 4(3) and 4(4) are diagrams for explaining the relationship between a tracking direction and scanning differences for a probe relative to a bit string;

FIGS. 12A through 12C and 12A' through 12C' are diagrams showing the correlation between data bit strings and changes of intensities of reproduced signals in FIG. 10; and FIG. 13 is a diagram illustrating a specific arrangement for a scanning circuit in FIG. 10.

DETAILED DESCRIPTION OF THE PREFERRED EMBODIMENTS

Figures 1, 1A:
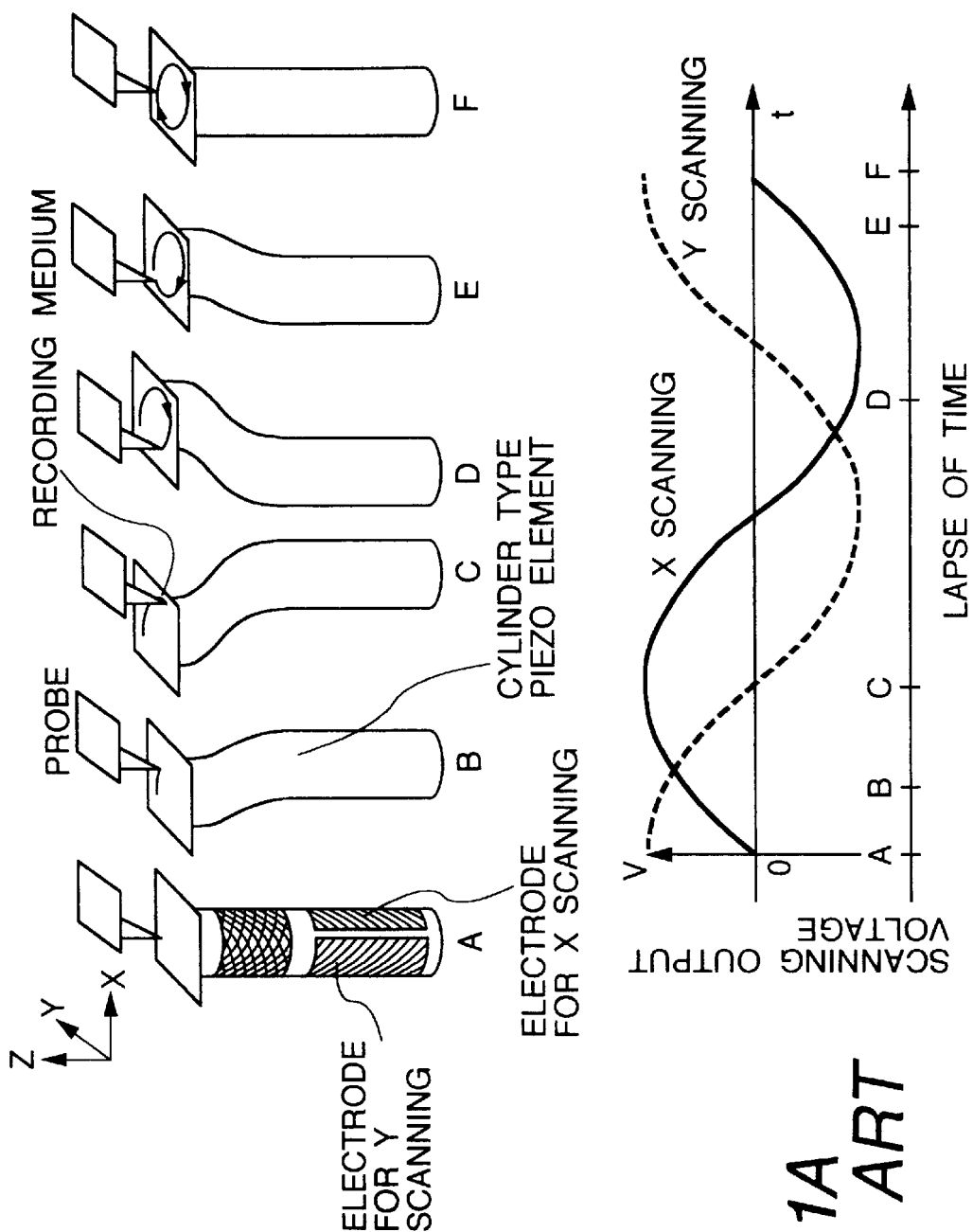
FIG. 1 is a diagram showing one example of a circumferential scanning method for an SPM memory, and signal waveforms during the scanning.

In the present invention, a flat-shaped recording medium is employed. A piezoelectric device, which is attached to a probe or to a substrate whereon the recording medium is mounted, is so employed that either the recording medium or the probe wobbles and moves relatively circumferentially. A data string is to be recorded spirally or concentrically. By using the piezoelectric device, the probe can access a desired data string for data recording and reproduction. Such an access of a desired data string is performed such that a position detector, such as a well known linear encoder, detects the position of a head unit. Then, the probe is controlled (tracking control) so as to trace the desired data string in the following manner.

The recording medium of the present invention consists of a thin film recording layer, which is formed of a π electron organic compound and a chalcogen compound, and a conductive substrate. For data recording, the probe accesses an expected, target data string formation position, and a bias voltage is applied between the probe and the substrate, by a voltage application power source, so that the probe can approach the recording layer until it is within a distance at which a tunneling current is induced.

Then, relative movement of the recording medium and the probe is performed, while a constant distance between the probe and the recording layer is maintained. When the probe is positioned to face a predetermined position on the surface of the recording layer, a voltage that exceeds a threshold value whereat the property of the recording layer begins to be changed is applied between the probe and the substrate.

As a result, the electrical characteristic of a minute portion immediately below the probe is changed. Now, assume that this condition represents a binary data bit setting of 1 (an ON bit), and the other condition, wherein a voltage that exceeds the threshold value is not applied And thus the electrical characteristic remains unchanged, represents a binary data bit setting of 0 (an OFF bit).

While relative movement of the recording layer and the probe is performed by movement of the recording medium, a voltage that exceeds the above mentioned threshold value is applied at a specific position on the recording layer in accordance with data to be recorded. As a result, binary data can be recorded on the recording layer.

To reproduce data that are thus recorded, a probe is caused to access to a target data string and a bias voltage, which is lower than the above described threshold value, is applied between the probe and the substrate, and the probe approaches the recording layer until it is within a distance whereat a tunneling current is induced. While a constant distance between the two is maintained, the recording layer is scanned by the relative movement of the recording medium and the probe.

At this time, a tunneling current flowing between the probe and the recording layer is changed when the probe passes through a changed characteristic portion (recording portion), which represents an ON bit, and when the probe passes through an unchanged characteristic portion (non-recording portion), which represents an OFF bit.

When the change in the tunneling current is binarized using a specific threshold value, and is detected while the recording layer is scanned by the probe, this detection signal represents recorded binary data. In this manner, data reproduction is performed.

Another type of recording medium in the present invention consists of a recording layer, which is formed of a thin metal film such as Au or Pt, and a substrate.

When a bias voltage is applied to the probe and the recording layer and, in the same manner as above, a voltage that exceeds a threshold value is applied while the distance between the two is maintained, a minute portion located immediately under the probe is melted or evaporated, so that the surface of the portion changes to cause a recess or projection to thereby effect recording of data.

At this time, if the height of the surface roughness of the recess or projection is set to several nm or less, the tip of the probe will not contact the projected portion even when a constant distance between the probe and the recording layer is maintained during the data reproduction.

The distance between the probe and the recording layer is changed as between when the probe passes across a portion in which data are recorded and when it passes across a portion in which no data is recorded, so that the tunneling current is changed. This change is detected in the same manner as described above, and enables the reproduction of data.

Preferred embodiments of the present invention will now be specifically described while referring to the accompanying drawings.

First, a recording and reproduction method according to one embodiment will be explained while referring to FIGS. 5 and 6.

Figure 2:
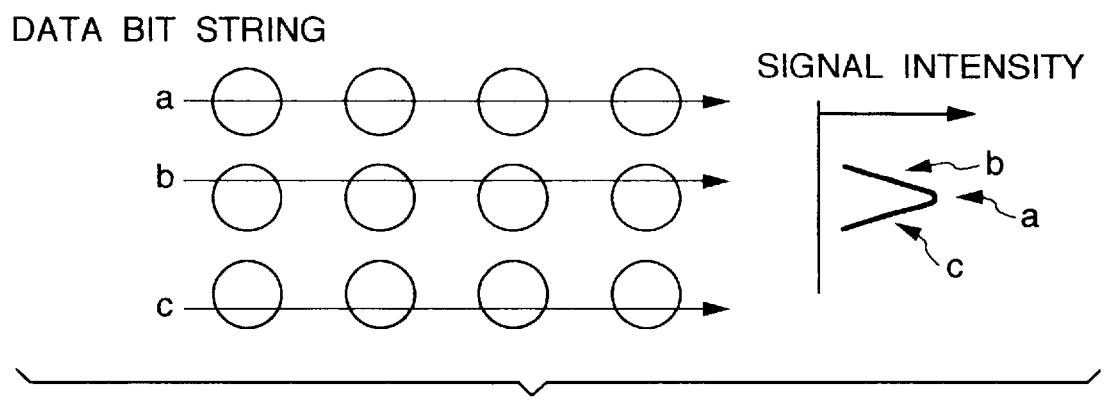
FIG. 2 is a diagram showing the correlation between data bit strings and changes in intensity of reproduced signals.

When a probe begins the scanning of a data string, a reproduction signal component for the data string, a fluctuation component due to the undulation of a recording surface, etc., are superimposed on a tunneling current signal that is an input reproduction waveform. The output signal of a logarithmic conversion circuit 401 is amplified by a signal amplifying circuit 402. Sequentially, a portion of the signal that is near the reproduction signal frequency is extracted by a band-pass filter 403, is passed through a waveform shaping circuit 405, and is finally output as data reproduction. In this case, the amplitude of the reproduction signal for a data bit is changed in accordance with deviation (see arrows a, b and c in FIG. 2) between the probe and the location of the data string on the recording medium. FIG. 2 is a graph showing an example data string, and the intensity of a recording bit reproduction signal that varies in consonance with probe scanning positions (indicated by arrows a, b and c) relative to the data string.

As is shown in FIG. 2, the amplitude, of a recording bit reproduction signal, which varies depending on the position of the probe, reaches maximum when the probe scans along the center line of the data string, and becomes smaller as the scanning position is shifted away from the center line of the data string. At this time, the probe is kept constantly vibrating (wobbling) with an amplitude that is smaller than the width of the data string and at a frequency f in a direction perpendicular to the data string. FIG. 5 schematically shows a controlling circuit for detecting a position drift (deviation) of a probe. In FIG. 5, a sine wave at the frequency f generated by a frequency oscillator 409 is passed through a scanning circuit 411 and is applied to an electrode of a cylindrical piezoelectric element for control of the probe. Therefore, the probe is constantly, minutely vibrated in a direction perpendicular to the data string. At this time, when the probe is vibrated at the frequency f and with the vibration amplitude smaller than the bit string diameter, the amplitude of a data string reproduction signal differs, as is shown in FIGS. 3A through 3F, because the amplitude of the bit reproduction signal varies in accordance with the path taken by the probe as it passes across the bit string.

Figure 3A:
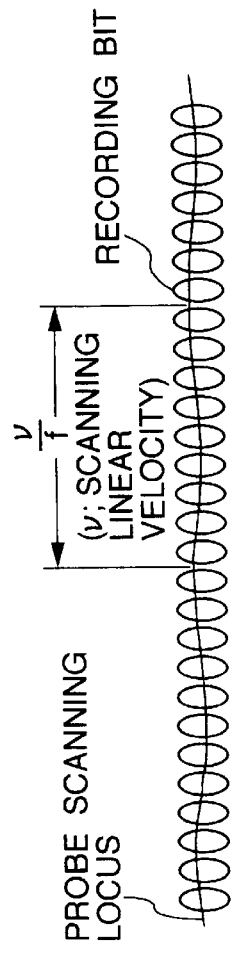
FIGS. 3A through 3C are diagrams showing scanning loci for a probe.
Figure 3B:
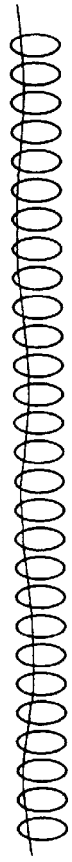
Figure 3C:
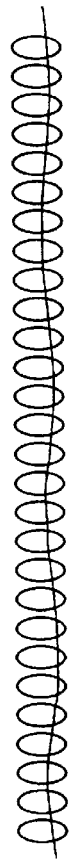
Figure 3D:
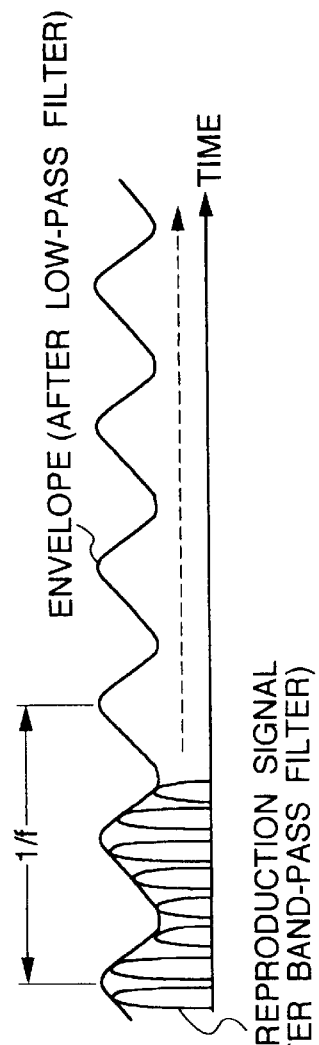
FIGS. 3D through 3F are diagrams showing reproduced waveforms that correspond to the scanning loci shown in FIGS. 3A through 3C.
Figure 3E:
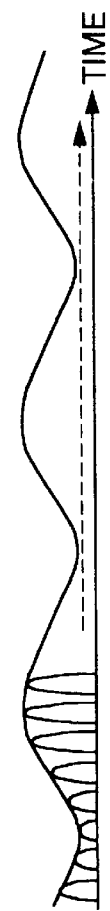
Figure 3F:
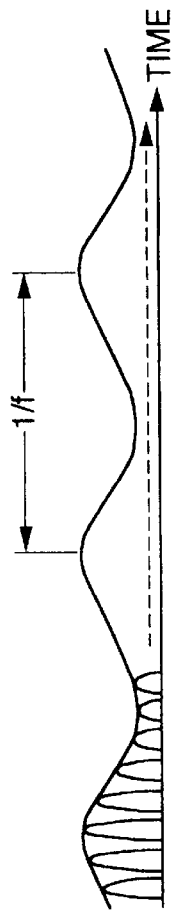
Figure 4A:
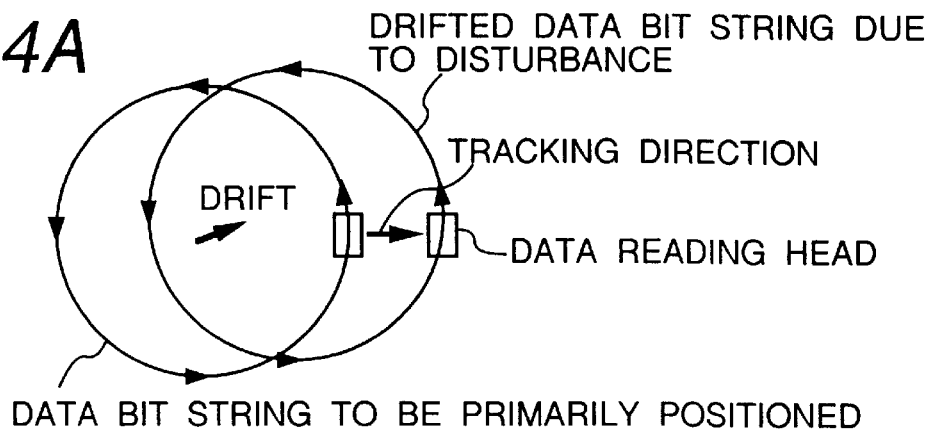
FIGS. 4(1) and 4(2) are diagrams showing the relationship between the location at which a data bit string is to be primarily positioned and a data bit string that has drifted due to a disturbance.
Figure 4B:
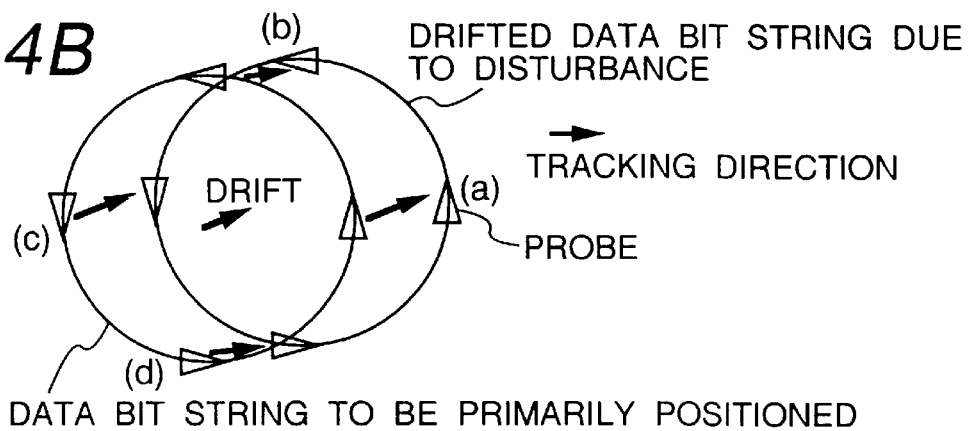
Figure 4C:
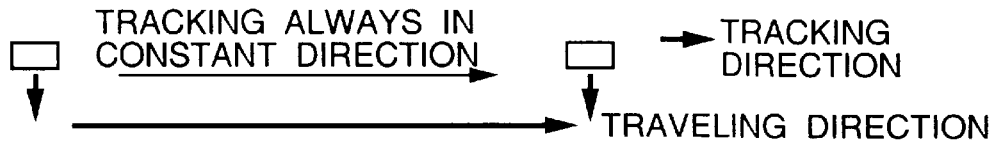
Figure 4D:
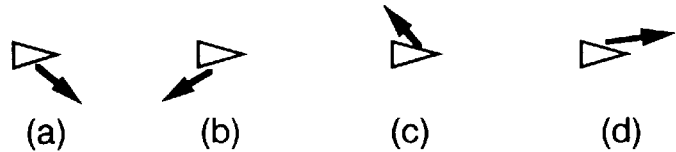

The probe scanning loci shown in FIGS. 3A through 3C correspond to reproduction waveforms shown in FIGS. 3D through 3F as those are changed in consonance with the scanning path of the probe. FIG. 3A shows a tracking-hit state wherein the probe passes along the center line of the bit string, and a frequency twice as high as that for micro-vibration appears as an envelope signal. On the other hand, in a tracking-error state wherein the scanning by the probe is shifted upward (a direction away from the center of rotation), or downward (a direction toward the center of rotation), a frequency appears that equals a frequency for micro-vibration in the direction perpendicular to the bit string, and as the probe scans further away from the center, the frequency component becomes greater.

More specifically, when the scanning of the probe is performed along the center line of the data string as shown in FIG. 3A, an envelope signal for a frequency component the same as the waveform of vibration of the probe does not appear because of the magnitude of a component of a frequency twice the vibration frequency of the probe as shown in FIG. 3D. For example, when the scanning of the probe is shifted upward, as shown in FIG. 3B, the envelope signal for a frequency component same as the vibration wave form of the probe appears to be shifted by 180° with respect to the vibration waveform of the probe. For example, when the scanning of the probe is shifted downward, as shown in FIG. 3C, the envelope signal for a frequency component same as the vibration waveform of the probe appears to be in phase with respect to the vibration waveform of the probe.

Therefore, when a probe vibration waveform (a wobbling signal) at the frequency f is employed as a reference signal to detect the phase of the waveform of a data bit string reproduction signal, there is obtained a signal proportional to the amount of deviation from the data string.

Feedback control is performed such that the obtained signal is added to, or subtracted from, a control voltage that is applied to an X scanning electrode or a Y scanning electrode of a cylindrical piezoelectric element, so that the signal itself approaches zero. As a result, tracking control in which the scanning position of the probe is as shown in FIG. 3A is performed.

A more specific explanation will be given while referring to FIG. 5. A data string reproduction signal output from the band-pass filter 403 is changed to an absolute value by an absolute value generating circuit 404. A low-pass filter 406 then removes a frequency of the data string reproduction signal from the absolute value to acquire an envelope signal for the amplitude of the data string reproduction signal. The envelope signal is input to a lock-in amplifier 407, and the phase of the envelope signal is detected using a reference phase signal that is output from a wobbling frequency oscillator 409. Then, an amplitude of the same frequency component that is equal to vibration frequency f of the probe is extracted from the envelope signal. This amplitude serves as a detection signal for positional deviation.

This signal is amplified by a signal amplifier 408, and the resultant signal is smoothed by a low-pass filter 410. Finally, the acquired signal is transmitted to a scanner 411 as a signal that is proportional to an amount of deviation of the probe from the data string, i.e., a signal for correcting the deviation between the probe and the data string.

If a system employed here is, for example, a floppy disk drive in which control is performed without changing a direction of movement of the probe relatively to the bit string (i.e., a system wherein a data recording surface is rotated around a predetermined axis perpendicular to the recording surface, and a probe is moved radially of the rotation surface only, i.e., the probe is moved either only a direction away from the rotation center or only a direction toward the rotation center, so as to access a desired data bit string to be read), the operation for returning the deviated probe to the center of the data bit string, i.e., probe tracking control, need only to be performed in a one-dimensional direction, either toward the rotation center or away from the center (see FIGS. 4(1) and 4(3)). For this system, tracking control can be performed by adding the above proportion signal to, or by subtracting the above proportion signal from, a scanning signal.

When the above described wobbling tracking control is applied to a system for performing circumferential scanning with a probe, however, as is shown in FIGS. 4(2) and 4(4), a moving direction of the probe with respect to a bit string is varied depending on the location of the probe on the circumference. In such a system, therefore, even though the proportion signal is simply added to, or subtracted from, the scanning signal, the probe is controlled only in one direction, either the direction toward the circumferential scanning center or the direction away from the center, so that the tracking control can not be properly performed. That is, when the control in a direction away from the center is added, the radius in the relative circumferential scanning movement is only increased, and on the other hand, when the control in a direction toward the center is added, the radius in the relative circumferential scanning movement is decreased. In either case, tracking control can not be properly performed.

In order to permit the probe to trace a drifted data bit drift in the circumferential scanning system, the direction for controlling the probe tracking must be varied in accordance with the location of the probe when viewed from the center of the relative circumferential scanning movement (FIG. 4(4)).

The above mentioned proportion signal input to the scanning circuit 411 is multiplied by an X scanning signal and a Y scanning signal for relative circumferential scanning movement, in order to add information concerning the direction for probe tracking control relative to the data bit string.

The scanning circuit 411 will now be described in detail while referring to FIG. 6.

The scanning circuit 411 (FIG. 6) generates a scan signal for the probe relative to the data bit string for data reproduction. The scanning circuit 411; which drives the cylindrical piezoelectric element, comprises: a portion for generating a signal waveform for permitting circumferential scanning movement; a portion for generating a signal waveform for the micro-vibration (wobbling) of a probe in a direction perpendicular to a circumferentially arranged data bit string; and a portion for generating a signal waveform for correcting the positional deviation of a probe with respect to the circumferentially aligned data bit string.

In this embodiment, variable frequency oscillators are employed as an X scanning oscillator 501 and a Y scanning oscillator 502. The X scanning and Y scanning oscillators 501 and 502 output sine wave signals that have the same frequency but that are shifted in phase by $\pi/2$ [rad] each other. As signal waveforms, for example the X scanning oscillator output is defined as a $\sin 2\pi f't$ signal, and the Y scanning oscillator output is defined as a $\cos 2\pi f't$ signal (wherein f': circumferential scanning frequency, and t: time). The signal from the X scanning oscillator 501 is transmitted to a multiplier 503 and an adder 507. At the same time, the signal from the Y scanning oscillator 502 is transmitted to a multiplier 504 and an adder 508. The waveforms of these signals serve as waveforms for circumferential scanning.

Figure 5:
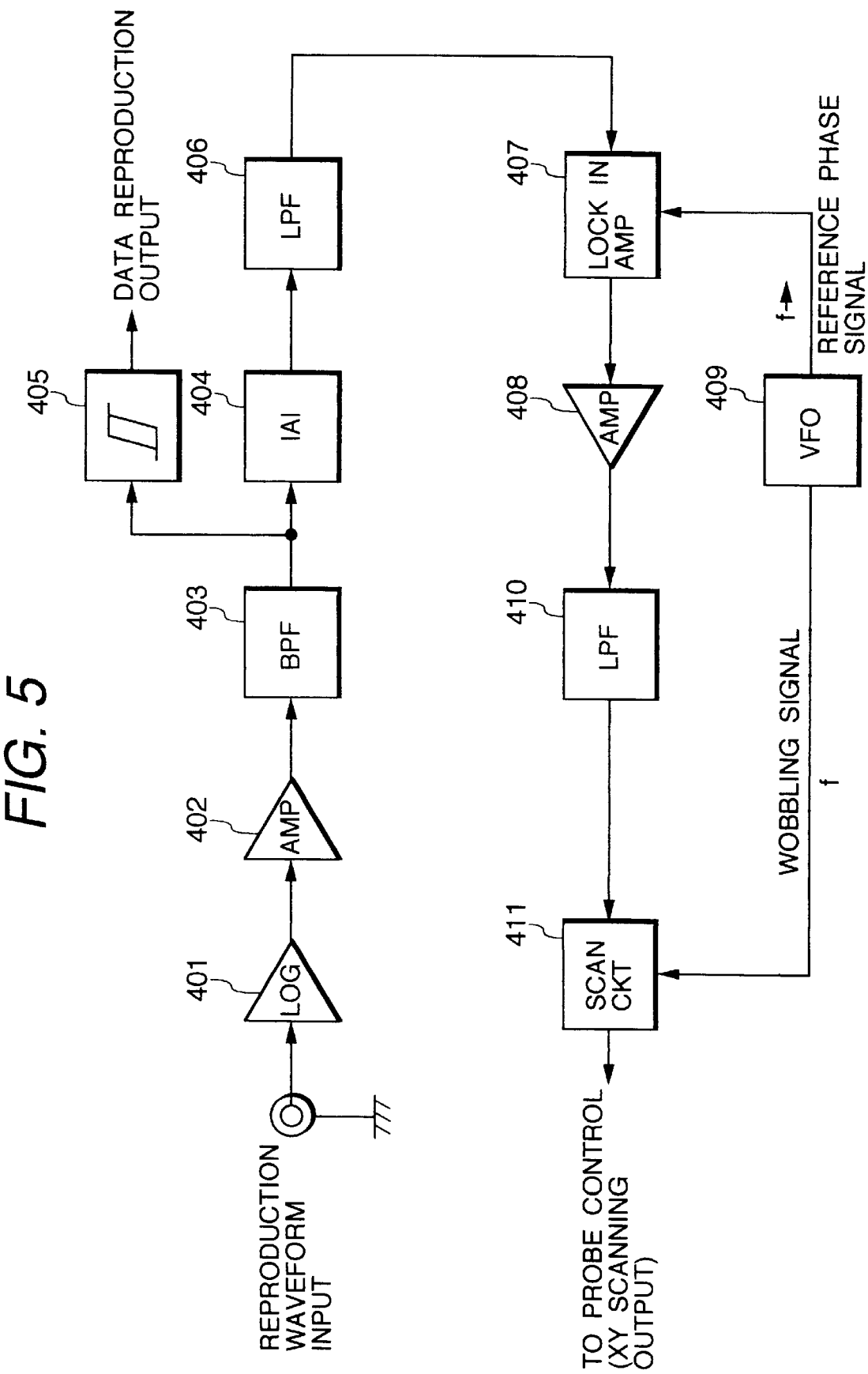
FIG. 5 is a diagram illustrating a control circuit for detecting a positional drift of a probe according to one embodiment of the present invention.
Figure 6:
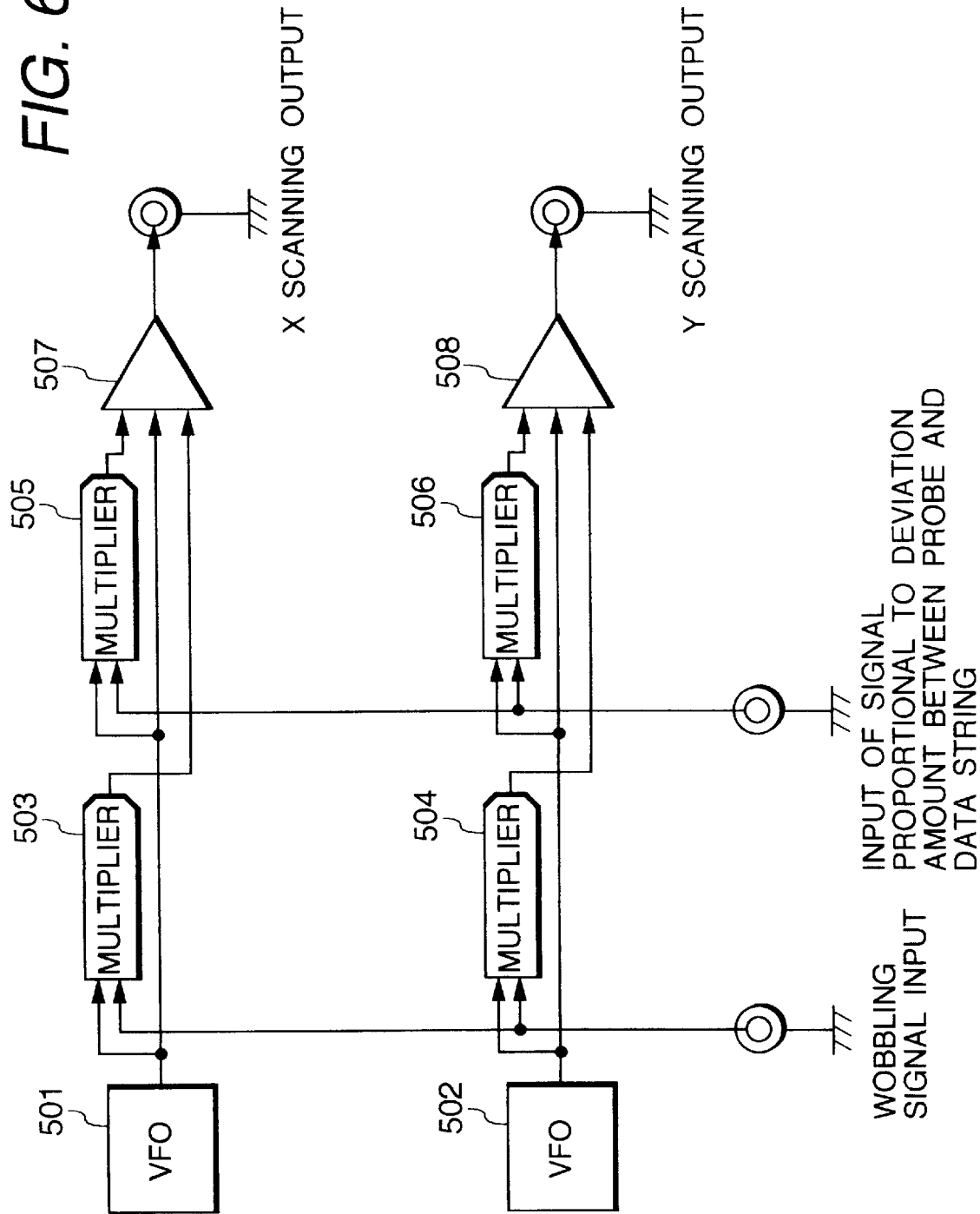
FIG. 6 is a diagram illustrating a scanning circuit according to an embodiment of the present invention.

The multipliers 503 and 504 multiply the signals received from the respective X scanning oscillator 501 and the Y scanning oscillator 502 by a wobbling signal at frequency f that is input from the wobbling frequency oscillator 409 in FIG. 5, provided outside the scanning circuit 411. The results are input to the adders 507 and 508. Assuming that the wobbling signal waveform is $\sin 2\pi ft$, and that when the above mentioned waveforms that are output by the XY scanning oscillators are employed, the signal waveforms that are output from the multipliers 503 and 504 are $\sin 2\pi f't \cdot \sin 2\pi ft$ and $\cos 2\pi f't \cdot \sin 2\pi ft$, respectively. These acquired signal waveforms serve as signal waveforms for micro-vibration (wobbling) of the probe in a direction perpendicular to the circumferentially aligned data bit string.

Multipliers 505 and 506 multiply the signals output from the X scanning oscillator 501 and the Y scanning oscillator 502 by a signal that is input from outside the scanning circuit 411 and that is proportional to an amount of deviation of the probe from the data string, i.e., by the output from the low-pass filter 410 in FIG. 5. The results are sent to adders 507 and 508. Supposing that a signal waveform that is proportional to the amount of the deviation of the probe from the data string is defined as $\Delta Tr$, when the above described waveforms that are output by the X and Y scanning oscillators are employed, the signal waveforms that are output by the multipliers 505 and 506 are $\sin 2\pi f't \cdot \Delta Tr$ and $\cos 2\pi f't \cdot \Delta Tr$, respectively. These signal waveforms serve as signal waveforms for correcting the positional deviation of the probe from the circumferentially arranged data bit string.

The adder 507 amplifies output signals from the X scanning oscillator 501 and the multipliers 503 and 505 at an appropriate amplification rate, and adds the results together. The output of the adder 507 is applied as an X scan drive voltage to the X scanning electrode of the cylindrical piezoelectric element. In the same manner, the adder 508 amplifies output signals from the Y scanning oscillator 502 and the multipliers 504 and 506 at an appropriate amplification rate, and adds the results together. The output of the adder 508 is applied as a Y scan drive voltage to the Y scanning electrode of the cylindrical piezoelectric element. According to the above described waveform examples, the output signal waveforms from the adders 507 and 508 are:

$Vc \cdot \sin 2\pi f't + Vb \cdot \sin 2\pi f't \cdot \sin 2\pi ft + VFB \cdot \sin 2\pi f't \cdot \Delta Tr$;
$Vc \cdot \cos 2\pi f't + Vb \cdot \cos 2\pi f't \cdot \sin 2\pi ft + VFB \cdot \cos^2 2\pi f't \cdot \Delta Tr$;
respectively, wherein Vc denotes a voltage value for determining the radius of circumferential scanning, Vb denotes a voltage value for determining the wobbling width of the probe, and VFB denotes a voltage value for determining the strength of the tracking control.

According to the above described signal processing, when the probe scans a data bit string circumferentially, positional information indicating how far the probe is away from the data hit string can be acquired from the proportion signal, and information for the probe tracking direction are obtained by 5 calculation of the proportional signal and a signal for the relative circumferential scanning movement. Therefore, information can be obtained that are required for tracking during the relative circumferential scanning movement.

As a result, the probe is controlled in a direction perpendicular to the data string and does not drift away from the data string, so that the probe correctly traces the data bit string and a reproduction signal for the data bit string is stabilized. When the probe is so controlled that it traces the data bit string in the above described manner, the probe is not easily adversely affected by undulation of the data bit string, temperature changes, and external disturbances such as vibration, and the data bit string can be stably reproduced.

Thus, a recording and reproduction apparatus that employs the principle of the scanning tunnel microscope is provided.

Figure 7:
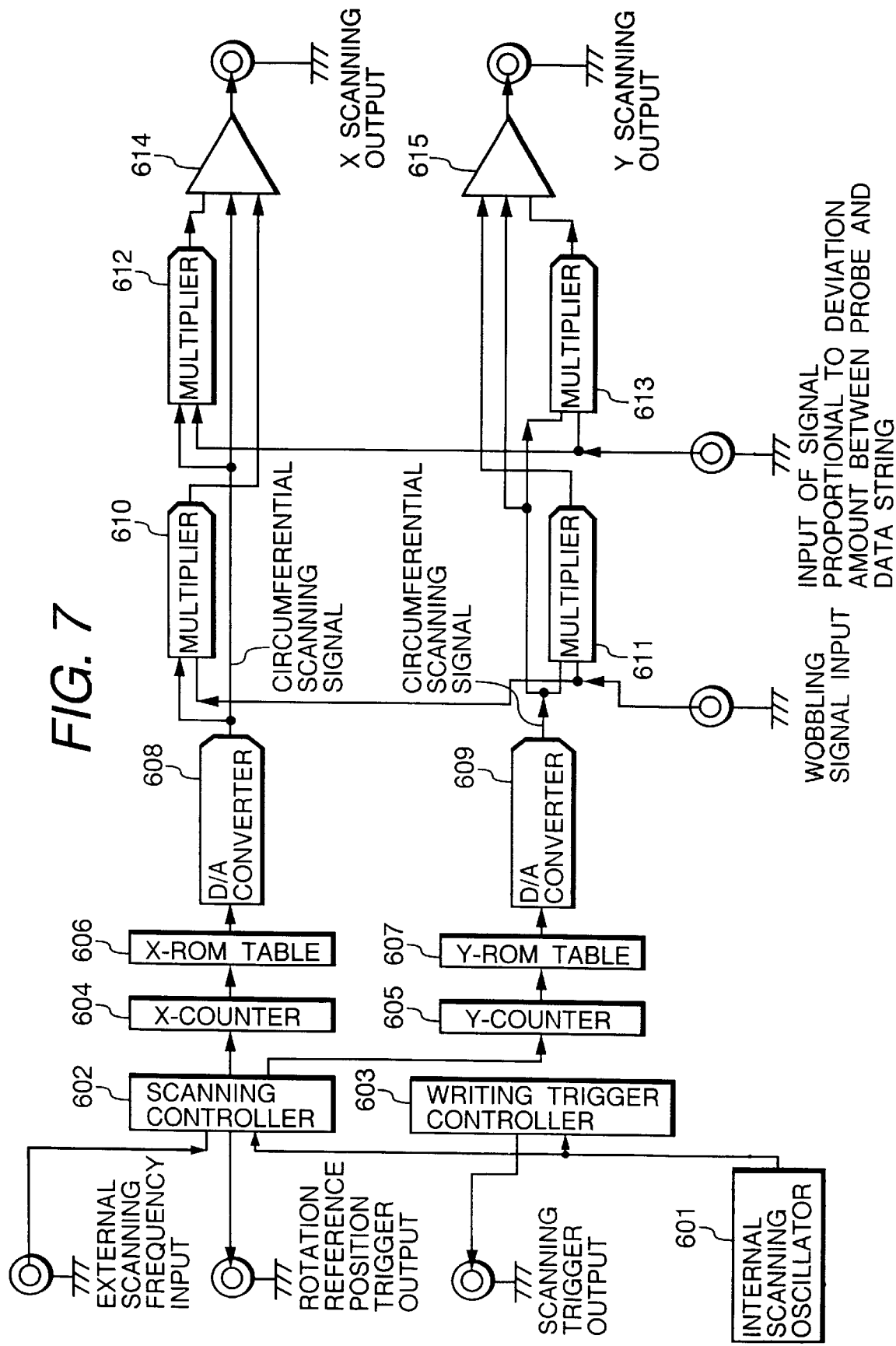
FIG. 7 is a diagram illustrating another scanning circuit according to an embodiment of the present invention.

According to this embodiment, variable frequency oscillators have been employed as the X and Y scanning oscillators for circumferential scanning of a probe relative to the circumferentially arranged data bit string. As is shown in FIG. 7, however, instead of the variable frequency oscillators, a circuit combination of an internal scanning oscillator 601, a scanning controller 602, an X-counter 604, a Y-counter 605, an X-ROM table 606, a Y-ROM table 607, and D/A converters 608 and 609 may be employed.

Figure 8:
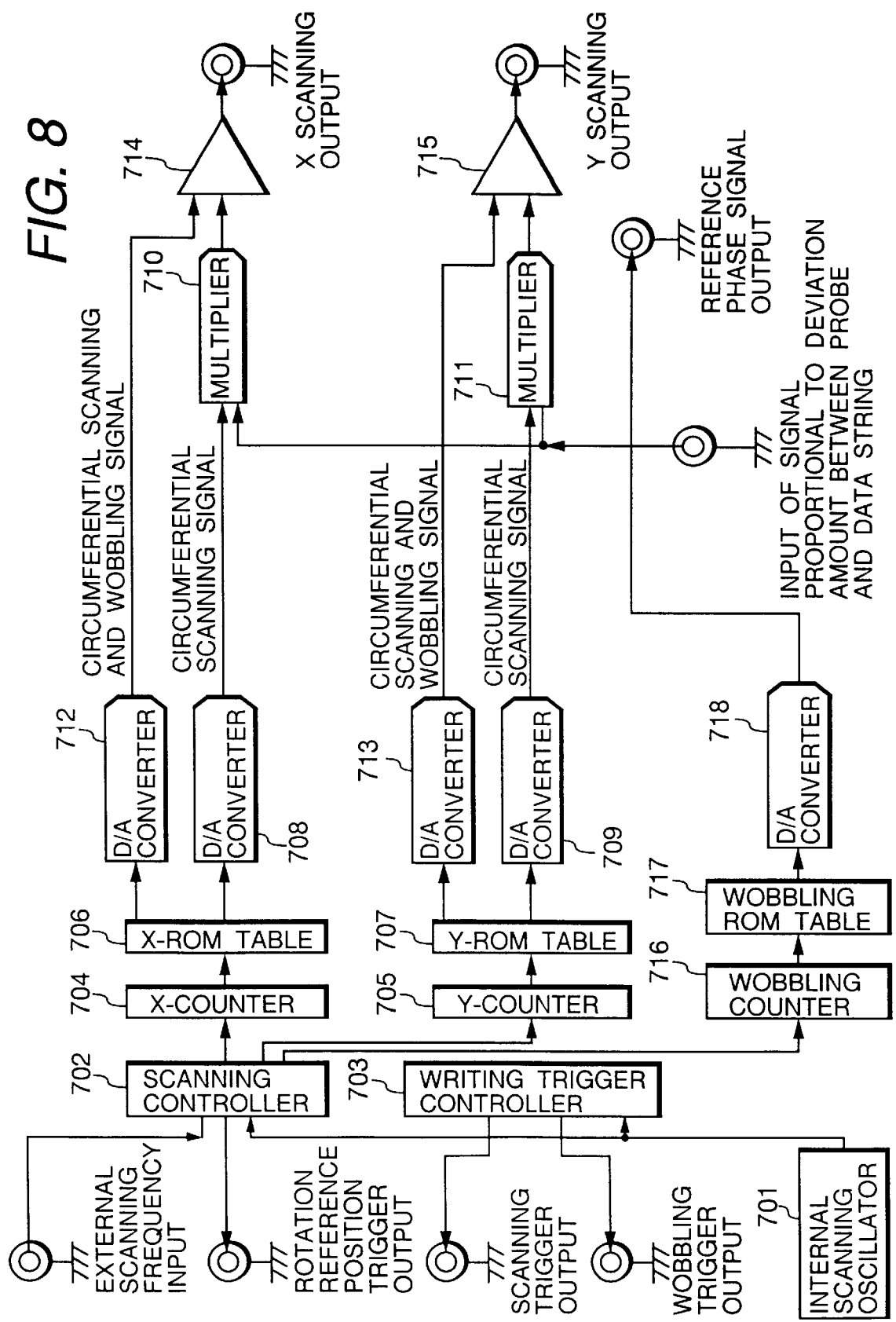
FIG. 8 is a diagram showing another circuit example according to an embodiment of the present invention.
Figure 9:
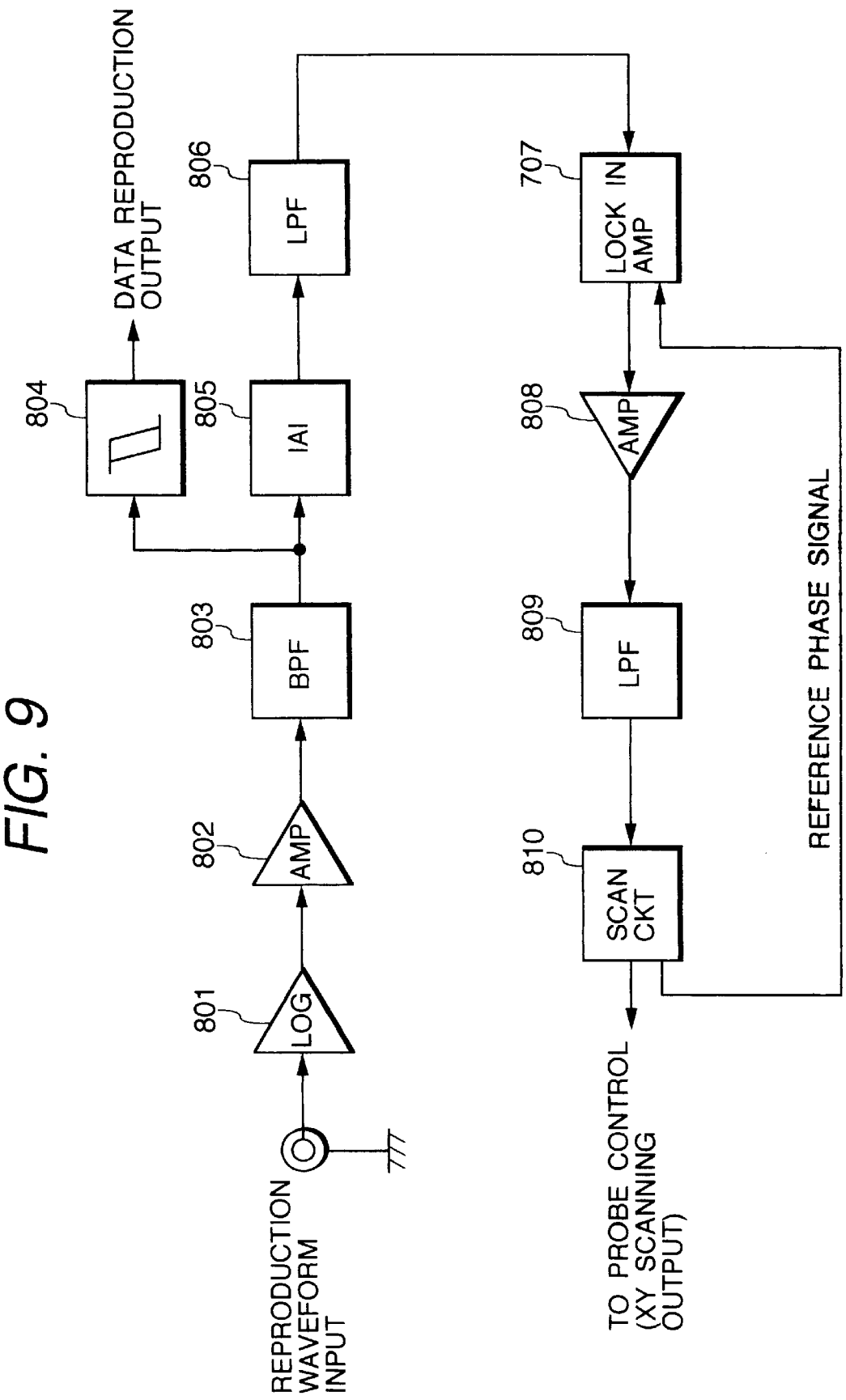
FIG. 9 is a diagram showing an additional circuit example according to an embodiment of the present invention.

In addition, instead of receiving a wobbling signal from outside the scanning circuit, as is shown in FIGS. 8 and 9 an internal scanning oscillator 701, a scanning controller 702, an X-counter 704, a Y-counter 705, an X-ROM table 706, a Y-ROM table 707, and D/A converters 712 and 713 may be combined and employed to output a circumferential scanning signal together with a wobbling signal. In this case, a reference phase signal that is employed for phase detection in a lock-in amplifier 807 is generated by a combination of the internal scanning oscillator 701, the scanning controller 702, a wobbling counter 716, a wobbling ROM table 717, and a D/A converter 718, and is output by a scanning circuit.

Another embodiment of the present invention will now be explained.

FIGS. 10 through 13 show one embodiment for a data string tracking method for recording a data bit while micro-vibration (wobbling) of a probe is conducted, in a direction perpendicular to the direction in which a data bit string is arranged, at vibration frequency f, and with an amplitude that is smaller than the width of the data bit string. According to this method, even though the probe does not minutely vibrate during data reproduction, wobbling tracking control is possible.

Figure 11A:
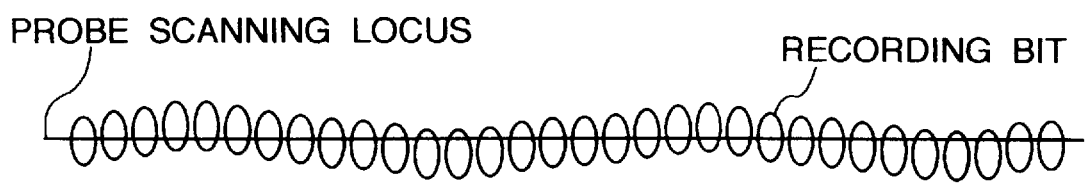
FIGS. 11A and 11B are conceptual diagrams showing wobbling record tracking and scanning of a recorded bit string in FIG. 10.
Figure 11B:
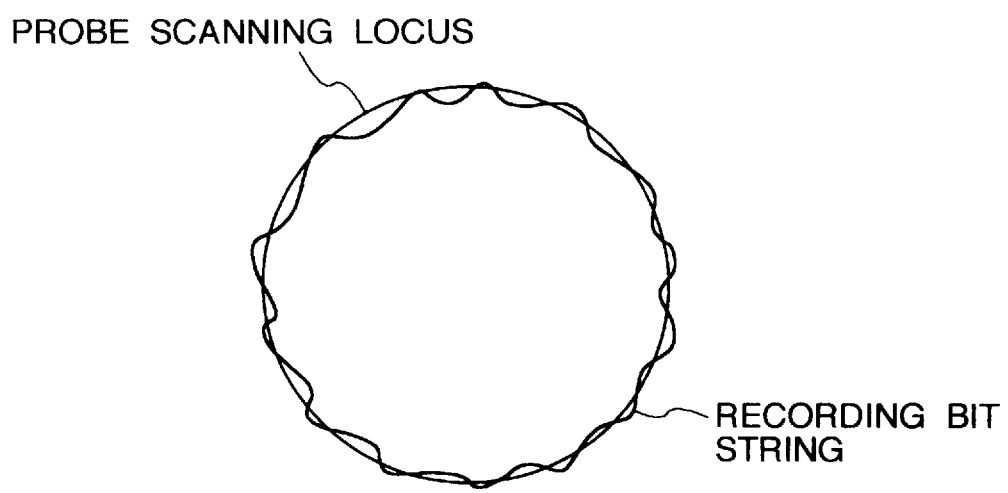

As is shown in FIG. 11B, which is a conceptual diagram for illustrating the scanning of a recording bit string, the data bits are recorded substantially circumferentially or spirally on the whole. When one part of the data bits are enlarged and examined in detail, as is shown in FIG. 11A, which is a conceptual diagram for illustrating the wobbling of the recording tracking, the data bits are so recorded that their positions are periodically shifted in a direction perpendicular to the direction in which the data bit string is arranged.

When the probe circumferentially scans the thus recorded data bit string, the amplitude of a recording bit reproduction signal is changed in accordance with a shift of the data bit string relative to the probe (FIGS. 12A', 12B' and 12C'). As well as in the previous embodiment, in a tracking-hit state (FIGS. 12A and 12A') wherein the probe is passed along the center line of the bit string, a frequency component twice the micro-vibration frequency f appears in a reproduction signal. On the other hand, in a tracking-error state (FIGS. 12B and 12B') wherein the scanning by the probe is shifted upward (a direction away from the relatively circumferential scanning center), or in a tracking-error state (FIGS. 12C and 12C') wherein the scanning by the probe is shifted downward (a direction toward the scanning center), a frequency component equal to the micro-vibration frequency f appears. As the amount of the deviation increases, the amplitude of the frequency component likewise becomes greater. The phase of a signal having the micro-vibration frequency component differs by $\pi$[rad], depending on the direction of deviation. Therefore, the amount of the deviation and the direction of deviation can be acquired by detecting the amplitude and the phase of said signal.

As in the previous embodiment, when a signal having the micro-vibration frequency f is employed as a reference signal to detect the phase of a data bit string reproduction signal, a signal is produced that is proportional to the amount of the deviation from a data string. Then, the feedback control is performed such that the obtained signal is added to, or subtracted from, a control voltage to be applied to an X scanning electrode or a Y scanning electrode of a cylindrical piezoelectric element, so that the signal itself approaches zero. As a result, the tracking control in which the scanning position of the probe is as shown in FIG. 12A can be performed.

A specific circuit structure for this embodiment will now be explained while referring to FIGS. 10 and 13.

Figure 10:
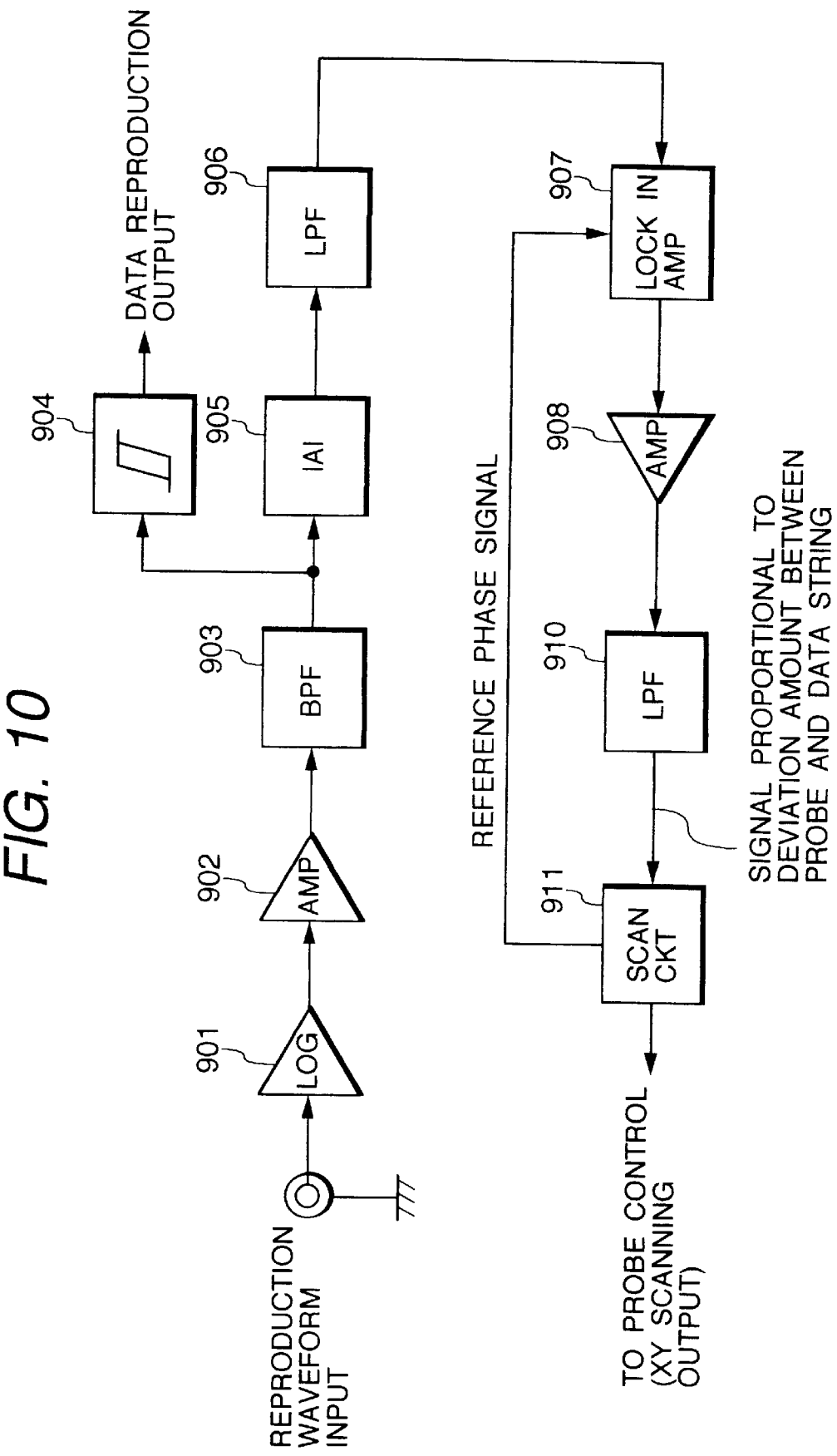
FIG. 10 is a diagram illustrating a controlling circuit for detecting positional drift of a probe according to another embodiment of the present invention.

In FIG. 10, a logrithmic conversion circuit 901 performs logarithmic conversion of a reproduction signal waveform for a recording bit string reproduced by a probe. The resultant signal is amplified by a signal amplifier 902, and only a data string reproduction signal is extracted by a band-pass filter 903. The data string reproduction signal is changed to an absolute value by an absolute value generating circuit 905. A low-pass filter 906 provides an envelope signal for the amplitude of the data string reproduction signal. The envelope signal is input to a lock-in amplifier 907, and the phase of the envelope signal is detected using a reference phase signal that is output by a scanning circuit 911. Then, the phase detection output is amplified by a signal amplifier 908, and the amplified signal is passed through a low-pass filter 910 to acquire a signal that is proportional to the amount of the deviation of the probe from the data string. This signal is transmitted to the scanning circuit 911, which in turn outputs a probe control signal for XY scanning.

FIG. 13 is a diagram for explaining the specific structure of the scanning circuit 911. In FIG. 13, X scanning and Y scanning oscillators 1301 and 1302 output sine wave signals (e.g., sin2$\pi$f't and cos2$\pi$f't) which have the same amplitude and frequency but the phases of which are shifted by $\pi$/2 [rad] each other. A signal from the X scanning oscillator 1301 is input to multipliers 1304 and 1308 and an adder 1306. At the same time, a signal from the Y scanning oscillator 1302 is input to multipliers 1305 and 1309 and an adder 1307. At the time of recording or reproduction, circumferential scanning of a probe is performed relative to a recording medium (a data bit string) by employing these signals.

During recording, a wobbling frequency oscillator 1303 transmits a micro-vibration signal (e.g., sin2$\pi$ft) with a frequency f to the multipliers 1304 and 1305. At this time, a reference phase signal is not output and the input signal that is proportional to the amount of the deviation from the probe from the data string is zero (tracking control by the present invention is not performed during recording). At the time of reproduction, a reference phase signal with a frequency f is transmitted from the wobbling frequency oscillator 1303 to a lock-in amplifier 907 in FIG. 10. At this time, the micro-vibration signal output is zero (micro-vibration is not performed during reproduction).

With respect to the two sine wave signals that are output from the X and Y scanning oscillators 1301 and 1302, the phases of the micro-vibration signal and the reference phase signal output from the wobbling frequency oscillator 1303 should be identical. It is then possible to exactly detect the direction of deviation at the time of reproduction.

The multipliers 1304 and 1305 multiply signals from the XY scanning oscillators 1301 and 1302 by a signal from the wobbling frequency oscillator 1303, and the results are input to the adders 1306 and 1307, respectively. Since using these signals the probe periodically vibrates in a direction perpendicular to the direction in which the data bit string is arranged to record data bits circumferentially, recording during which the positions of bits are shifted in the same cycle can be performed.

The multipliers 1308 and 1309 multiply signals from the XY scanning oscillators 1301 and 1302 by a signal that is input from outside the scanning circuit 911 and is proportion to the amount of the deviation of the probe from the data string, and the results are input to the adders 1306 and 1307. Since using these signals minute demodulation is added, at the time of reproduction of a data bit string that is recorded substantially circumferentially, tracking control can be performed to correct for positional shifting of the probe with respect to the data bit string.

The adder 1306 amplifies signals from the X scanning oscillator 1301 and the multipliers 1304 and 1308 at an appropriate amplification rate, and adds the results together. The output of the adder 1306 is applied as an X scan drive voltage to the X scanning electrode of the cylindrical piezoelectric element. In the same manner, the adder 1307 amplifies output signals from the Y scanning oscillator 1302 and the multipliers 1305 and 1309 at appropriate amplification rate, and adds the results together. The output of the adder 1307 is applied as a Y scan drive voltage to the Y scanning electrode of the cylindrical piezoelectric element.

According to the above described signal processing, when the probe scans a data bit string circumferentially, positional information indicating how far distant the probe is from the data bit string can be acquired from the proportion signal, and information for the direction of probe tracking is obtained by calculation of the proportional signal and a signal for the relative circumferential scanning movement. Therefore, information that are required for tracking during the relative circumferential scanning movement can be obtained.

As a result, the probe is controlled in a direction perpendicular to the data string so as not to deviate from the data string, so that the probe correctoly traces the data string and a reproduction signal for the data string is stabilized. When the probe is so controlled that it correctly traces the data string in the above described manner, it is not easily adversely affected by undulation of a data string, temperature changes, and external disturbances such as vibration, and data strings can be stably reproduced.

In the above embodiments, an explanation has been given by employing a recording and reproduction apparatus that employs the principle of a scanning tunnel microscope. However, the physical characteristic used in the present invention is not limited to the tunneling current, atomic energy, an evanescent beam, etc., may be also employed.

What is claimed is:

1. An information processing apparatus for recording and/or reproducing a circumferential data string on or from a recording medium using a probe, comprising:

a scanning mechanism for performing relative movement of said probe and the recording medium so that said probe scans said recording medium;

a drive circuit for supplying drive signals of plural directions to said scanning mechanism so as to permit said probe to scan said recording medium circumferentially;

an oscillation circuit for performing relative vibration of said probe and said recording medium so that microvibration is effected such that said probe crosses a data bit included in said data string in a direction perpendicular to said data string;

a detecting circuit for detecting a signal that corresponds to a positional deviation of said probe from said data string and for outputting a detection signal; and a plurality of multipliers for multiplying said detection signal by the respective drive signals of the plural directions and for outputting multiplier signals, wherein said scanning mechanism is driven on the basis of the multiplier signal.

2. An information processing apparatus according to claim 1, wherein the micro-vibration of said probe by said oscillation circuit is not performed during recording of said data string, but the micro-vibration of said probe by said oscillation circuit is performed during reproduction of said data string.

3. An information processing apparatus according to claim 1, wherein the micro-vibration of said probe by said oscillation circuit is performed during recording of said data string, but the micro-vibration of said probe by said oscillation circuit is not performed during reproduction of said data string.

* * * * *

UNITED STATES PATENT AND TRADEMARK OFFICE
CERTIFICATE OF CORRECTION

PATENT NO. : 5,805,541
DATED : September 8, 1998
INVENTOR(S) : Akihiro Takeda et al.

It is certified that error appears in the above-identified patent and that said Letters Patent is hereby corrected as shown below:

Title page,
Item [73], Assignee, "Cannon Kabushiki Kaisha," should read -- Canon Kabushiki Kaisha, --.

Column 4,
Line 7, "well know" should read -- well-known --.
Line 31, "applied And" should read -- applied, and --.

Column 5,
Line 40, "amplitude," should read -- amplitude --.

Column 6,
Line 61, "relatively" should read -- relative --;
Line 64, "surf ace," should read -- surface, --;
Line 65. "a" should be deleted;
Line 66, "direction" and "a direction" should be deleted.

Column 7,
Line 42, "411;" should read -- 411, --.

Column 8,
Line 29, "rate,. and" should read -- rate, and --;
Line 50, "hit" should read -- bit --;
Line 54, "are" should read -- is --.

Column 10,
Line 10, "logrithmic" should read -- logarithmic --.

Column 11,
Line 3, "proportion" should read -- proportional --;
Line 34, "correctoly" should read -- correctly --.

UNITED STATES PATENT AND TRADEMARK OFFICE
CERTIFICATE OF CORRECTION

PATENT NO. : 5,805,541
DATED : September 8, 1998
INVENTOR(S) : Akihiro Takeda et al.

It is certified that error appears in the above-identified patent and that said Letters Patent is hereby corrected as shown below:

Column 12,
Line 23, "and a" should read -- and ¶ a --;
Line 27, "wherein" should read -- ¶ wherein --.

Signed and Sealed this

Twentieth Day of November, 2001

Attest:

*Nicholas P. Godici*

NICHOLAS P. GODICI
*Attesting Officer*     *Acting Director of the United States Patent and Trademark Office*